United States Patent [19]
Klingel

[11] Patent Number: 4,796,272
[45] Date of Patent: Jan. 3, 1989

[54] $CO_2$ LASER

[76] Inventor: Hans Klingel, Teckstr. 91, D 7141 Moeglingen, Fed. Rep. of Germany

[21] Appl. No.: 69,764

[22] Filed: Jul. 6, 1987

Related U.S. Application Data

[62] Division of Ser. No. 745,539, Jun. 17, 1985.

[30] Foreign Application Priority Data

Jun. 16, 1984 [DE] Fed. Rep. of Germany ....... 3422525

[51] Int. Cl.$^4$ .............................................. H01S 3/097
[52] U.S. Cl. ......................................... 372/87; 372/61
[58] Field of Search ......................... 372/88, 87, 82, 61

[56] References Cited

U.S. PATENT DOCUMENTS 4,375,690 3/1983 Tabata et al. ........................ 372/88

FOREIGN PATENT DOCUMENTS 0147186 8/1985 Japan ..................................... 372/87

OTHER PUBLICATIONS

Crocker et al., "Carbon-Dixiode Laser With High Power Per Unit Length"; Electronics Lett., vol. 5, No. 4, 20 Feb. 1969.

Reid et al., "Three Phase Excitation of a Hollow Cathode Laser"; Quant. Electronics Lett, IEEE JQE, vol. QE-16, No. 1, Jan. '80.

Primary Examiner—Leon Scott, Jr.

[57] ABSTRACT

A longitudinal flow $CO_2$ laser with an output of at least several hundred Watts has a rectilinear tube device for dielectric material containing $CO_2$ and high frequency electrodes in a plurality of pairs arranged diametrically opposed to each other. Each pair of opposed high frequency electrodes has a central plane offset at an angle relative to the central plane of an adjacent pair of high frequency electrodes. The angle is approximately 360 degrees divided by the number of pairs of high frequency electrodes. The high frequency electrodes contact the rectilinear tube device over a significant lateral distance.

12 Claims, 5 Drawing Sheets

$CO_2$ LASER

This is a divisional to patent application Ser. No. 745,539, filed June 17, 1985.

The invention relates to a longitudinal-flow $CO_2$ laser, and more particularly to a $CO_2$ laser having a retilinear tube device of dielectric material and an end flange device at each end zone of the tube device. These lasers have a gas connecting aperture in each of the end flange devices which communicates with the tube device and high frequency electrodes extending longitudinally relative to the tube device.

BACKGROUND OF THE INVENTION

Such lasers are within the category of molecular lasers. They operate almost always continuously. Despite the fact that CO has given them their name, other substances, such as, for example, N are represented in substantially higher percentages. The mixture of gases may consist, for example, of 10% $CO_2$, 20% N and 70% He.

At around 15%, the efficiency of the $CO_2$ laser is relatively high. Its wavelength is around 10.6 micrometers and is thus in an atmospheric "window". In consequence, it can also be guided over considerable distances in the atmosphere with minimal damping. If it is desired to use the laser beam to cut through relatively thick metal plate, then with the current state of the art, cutting must be carried out in an oxygen atmosphere, because lasers which are not subsidized, but which are sold industrially at a profit, only give off energy continuously in a kilowatt range.

Vital to the quality of cutting is the distribution of the laser beam energy over its cross-section. Truly ideal is the mode of zeroth order, also referred to as the Gaussian mode and characterized by a very homogeneous Gaussian distribution. This mode also imitates the peripheral form of a machine tool, such as for example, a drill, a milling tool, a nibbler or the like, so that very much cogitation is not required in this respect.

Laser beams can be deflected, of course, by mirror movements and so create patterns on the material which is to be machined, or they may, of course, pass completely through the material. Here, too, it is possible to work more easily with the circular beam because the reflection of a circle is more easily monitored than the reflection of complicated figures.

For equal energy, the mode of zeroth order also has a smaller cross-section than modes of a higher order. This means for instance, that it is possible for the mirrors, too, to be made smaller. Also, it is easier to forecast how a mirror surface will behave when reflecting a mode of zeroth order.

Whether a mode of zeroth order is approximately or entirely achieved, depends less upon the constancy of interval between the mirrors participating in the resonance. Instead, the essential criterion here is the deviation of the mirror reflection from parallelity in relation to the geometrical longitudinal axis of the laser. This deviation may have several sources. Naturally, manufacturing faults play a part. Another contributing factor is whether such lasers have a length which falls in the meter range. Here, the statically produced sag caused by the earth's attraction may play a part. Machine tools are also subject to all manner of vibrations of the most widely diverse amplitude and frequency whether they are generated by the machine tool which is equipped with the laser or whether they are caused by other machinery, vehicles, lifts or the like. In those cases, too, there are deviations from the ideal mode. Above all, though, the energy wasted gives rise to deviations of curvature from the geometrical longitudinal axis. This is due to the following consideration which is based on magnitude: let us assume that the electrical energy supplied to a laser is 3 kilowatts. The laser beam emitted is assumed then to have an effective output of 500 Watts. The energy irradiated is then, in terms of magnitude, around 2.5 kilowatts. If a laser is switched on when work commences, then the mode may initially be correct. With increasing heating-up of the mechanical supporting device, the mode tends increasingly towards a mode of higher order which may perhaps not be noted at all.

A disadvantage of current lasers is, too, the fact that their energy cannot be multiplied while retaining essential structural principles. Each laser is a specialist in its own field.

OBJECT AND STATEMENT OF THE INVENTION

The object of the invention is to provide a laser of the type mentioned at the outset, which retains its mode both in respect of constant and dynamic load variables and which nevertheless, by being of modular construction, permits adaptation to the machining problem, and which can be produced at prices which allow for a profit under the competitive conditions of the open market.

According to the invention, this problem is resolved by the following features:

The high frequency electrodes comprise a plurality of pairs of high frequency electrodes arranged diametrically opposed to each other. Each pair of opposed high frequency electrodes has a central plane that is offset at an angle relative to the central plane of an adjacent pair of high frequency electrodes, which angle is approximately 360 degrees divided by the number of pairs of high frequency electrodes. And the high frequency electrodes contact the rectilinear tube device over a significant lateral distance.

Advantageously, the invention includes the following addition features:

Three pairs of high frequency electrodes are offset approximately 120 degrees from each other.

Four pairs of high frequency electrodes are offset approximately 90 degrees from each other.

The laser is a folded longitudinal flow $CO_2$ laser comprising a plurality of individual tubes between the end flange devices.

The individual tubes are disposed symmetrically of the geometrical longitudinal axis.

The high frequency electrodes lie symmetrically with planes that pass through the geometrical longitudinal axis. The individual tubes have inner and outer high frequency electrodes. A common outer ring connects the outer high frequency electrodes. A common inner ring connects the inner high frequency electrodes. First and second connecting lines connect to the common outer and inner rings respectively. And a high frequency connection is connected to the first and second high frequency connecting lines.

The common inner ring is folded like a star having as many points with flanks and end zones as there are associated individual tubes. The end zones of the star points are disposed between adjacent tubes while the flanks of each of the star points follow circular segments of the inner electrodes.

The outer contours of the end flange devices are substantially circularly cylindrical in relation to the geometrical longitudinal axis.

A supporting device has a plurality of circularly-cylindrical, axially-parallel rods. The rods have end zones fixed to the end flange devices at the same angular spacing from one another.

DETAILED DESCRIPTION

Figure 1:
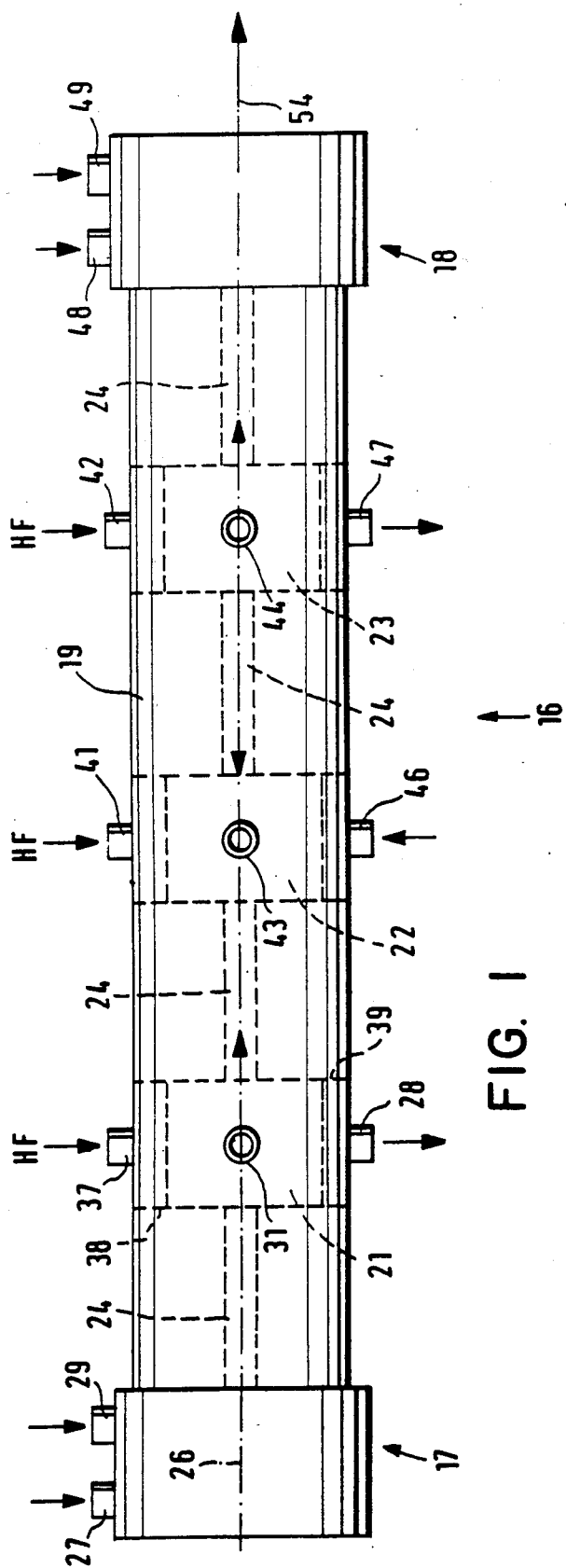
FIG. 1 is a highly simplified front view of the invention with a modular construction.

A laser 16 comprises a left-hand end flange device 17, a right-hand end flange device 18, a supporting device 19, intermediate flange devices 21, 22, 23 provided in the supporting device 19 and a portionally extending tube device 24. Vital to the construction of the laser 16 is a geometrical longitudinal axis 26.

Figure 4:
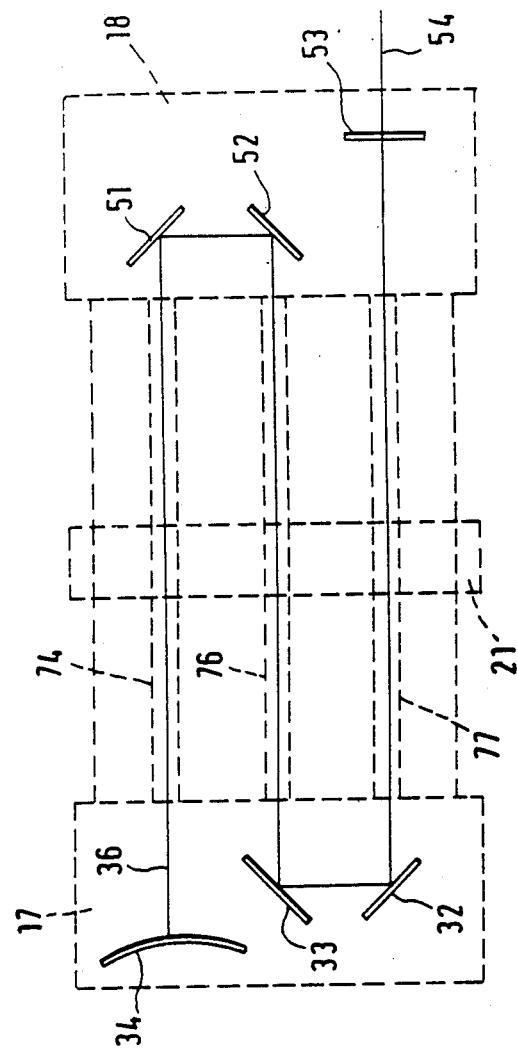
FIG. 4 is a view in one plane and opened up to show the principle of the beam path in the device according to FIG. 3.

Serving for cooling purposes, transformer oil is fed to the end flange device 17 through a connection 27, emerging in a heated state again at the connection 28 of the intermediate flange device 21. Through a connection 29 there is fed to the end flange device 17 laser gas which flows through that part of the tube device 24 which is located between the end flange device 17 and the intermediate flange device 21. The heated gas emerges at two connections 31, of which one projects upwardly out of the plane of the drawing in FIG. 1 while the other projects downwardly. In the end flange device 17 are two 45 degree mirrors 32, 33, a concave mirror 34 curved to a radius of 10 meters, the mirrors reflecting a beam 36 into the tube device 24 as shown in principle in FIG. 4.

High frequency energy of 13 or 27 megahertz is fed to the intermediate flange device 21 through a connection 37 at which the power level of the energy is 2.5 to 6 kilowatts.

The intermediate flange device 21 has a left-hand radial flange 38 and a right-hand radial flange 39. With these flanges 38, 39, the intermediate flange device 21 is positioned on the supporting device 19 in relation to the geometrical longitudinal axis 26, but can, however, move along this with a translatory movement through distances which entail changes in temperature, whether the supporting device 19 changes its length—which would probably represent the main influencing factor—or the intermediate flange device 21 changes its length, or that part of the tube device 24 which is right over on the left-hand side changes its length.

The other intermediate flange devices 22, 23, are of identical construction and are disposed in the same spatial location as the intermediate flange device 21. None of the intermediate flange devices 21, 22, 23, contains a mirror. The intermediate flange device 22 has high frequency energy of the same frequency fed to it through a connection 41 while the intermediate flange device 23 has high frequency energy of the same frequency fed to it through a connection 42. Laser gas is fed to the two connections 43 and discharged from the two connections 44. The laser gas fed to the connections 43 emerges partially from the connections 31 and partially from the connections 44.

For cooling purposes, oil is fed to a connection 46 of the intermediate flange device 22 and emerges partially from the connection 28 of the intermediate flange device 21 and partially from the connection 47 of the intermediate flange device 23. The intermediate flange devices 22, 23, are connected to the supporting device 19 in the same way as the intermediate flange device 21, i.e. they are mounted in floating fashion on the supporting device 19 to move as the result of heat expansion. The amounts of such movements are of the order of tenths of a millimeter.

Like the end flange device 17, so the end flange device 18 is also rigidly connected to the right-hand end zone of the supporting device 19. Through a connection 48, oil is fed to it and re-emerges at the connection 47. Furthermore, through a connection 49, laser gas is fed to it and emerges again at connection 44. Disposed in the end flange device 18 are two 45 degree mirrors 51, 52 which reflect the laser beam according to FIG. 4. The mirror 53 is flat, reflects the major part of the laser beam back into the resonance path and allows about 20% of it to emerge as a working beam 54.

Since mirror surfaces are less consumed by cool gas than by hot gas and since the end flange devices 17, 18, accommodate the mirrors, cool gas is fed to the end flange devices 17, 18, but is not substantially extracted from the end flange devices 17, 18, through the connections 29, 49. This circumstance also means that it is possible only to provide an odd number of intermediate flange devices. Therefore, there is one or there are three or five or seven, etc., intermediate flange devices.

The end flange devices 17, 18, are light since, on the one hand, they incorporate cavities, still to be discussed, and since, on the other hand, they consist of an aluminum alloy. In principle, the same applies to the intermediate flange devices 21, 22, 23. The supporting device 19 is of steel and can be bent only negligibly with regard to the length of the laser 16, so that the geometrical longitudinal axis 26 is retained, in fact both under thermally differing operating conditions and also under static loadings such as, for example, sag, or in respect of the weight of the feed to the various connections, the forces of gravity, etc.

This guarantees that the various mirrors always retain the angular position to which they have once been adjusted. The cross-section of the working beam 54 looks as shown in the top left-hand part of FIG. 2 and does not have the configuration of a higher order as shown by the other three cross-sectional representations in FIG. 2. In that case, there would then be little or no energy particularly in the core region, the cross-section would be in some cases greater and the workpieces machined would not have such smooth cut surfaces if the working beam 54 is used for cutting.

Figure 3:
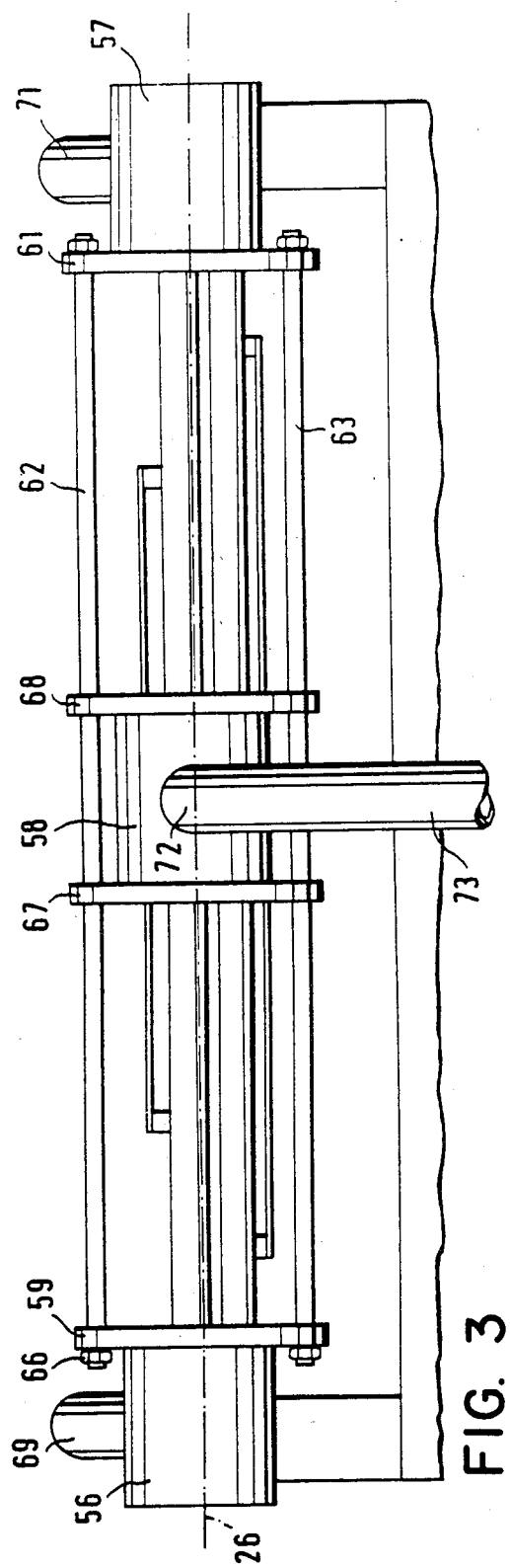
FIG. 3 is a front view similar to FIG. 1 of an actually constructed laser but with two groups of discharge paths.

The less diagramatic view in FIG. 3 shows a left-hand substantially circularly cylindrical end flange device 56 and a similar end flange device 57 with an intermediate flange device 58. Here, the end flange devices 56, 57, do not have any connections such as for oil, because ambient air is the means of carrying away the lost power. The end flange devices 56, 57, have on the mutually facing sides and extending beyond what is otherwise their periphery a fixing flange 59, 61, which is positioned at a right-angle to the geometrical longitudinal axis 26. In their protruding zone, the fixing flanges 59, 61, have through bores aligned in the longitudinal direction and staggered in respect of each other by 90 degrees in each case. These bores are traversed by four circularly cylindrical metal rods 62, 63, 64, of which the end zones are rigidly fixed to the fixing flanges 59, 61, by screws 66. For connection times within the minutes range, these metal rods 62, 63, 64 may be solid. For longer connection times, they must be constructed as tubes and a cooling fluid must flow through the cavity within them so that their heat expansion remains constant. The metal rods 62, 63, 64, may consist for example of steel or an invar material.

Corresponding to the fixing flanges 59, 61, the intermediate flange device 58 has two identically outwardly projecting radial fixing flanges 67, 68, which have for the straight metal rods 62, 63, 64, bores aligned with the bores in the fixing flange 59, 61. The fit between the bores in the fixing flanges 67, 68, on the one hand and the diameter of the metal rods 62, 63, 64, is such that the geometrical longitudinal axis 26 may indeed be aligned, but at least in the magnitude of heat expansion the intermediate flange device 58 is longitudinally displaceable as a guide with the metal rods 62, 63, 64. The gas is fed to the end flange devices 56, 57, via connections 69, 71, and is extracted through two diametrically opposed connections 72. A flexible tube 73 or a correspondingly shaped tube—one for each connection 71, 72,—extracts the gas.

Figure 6:
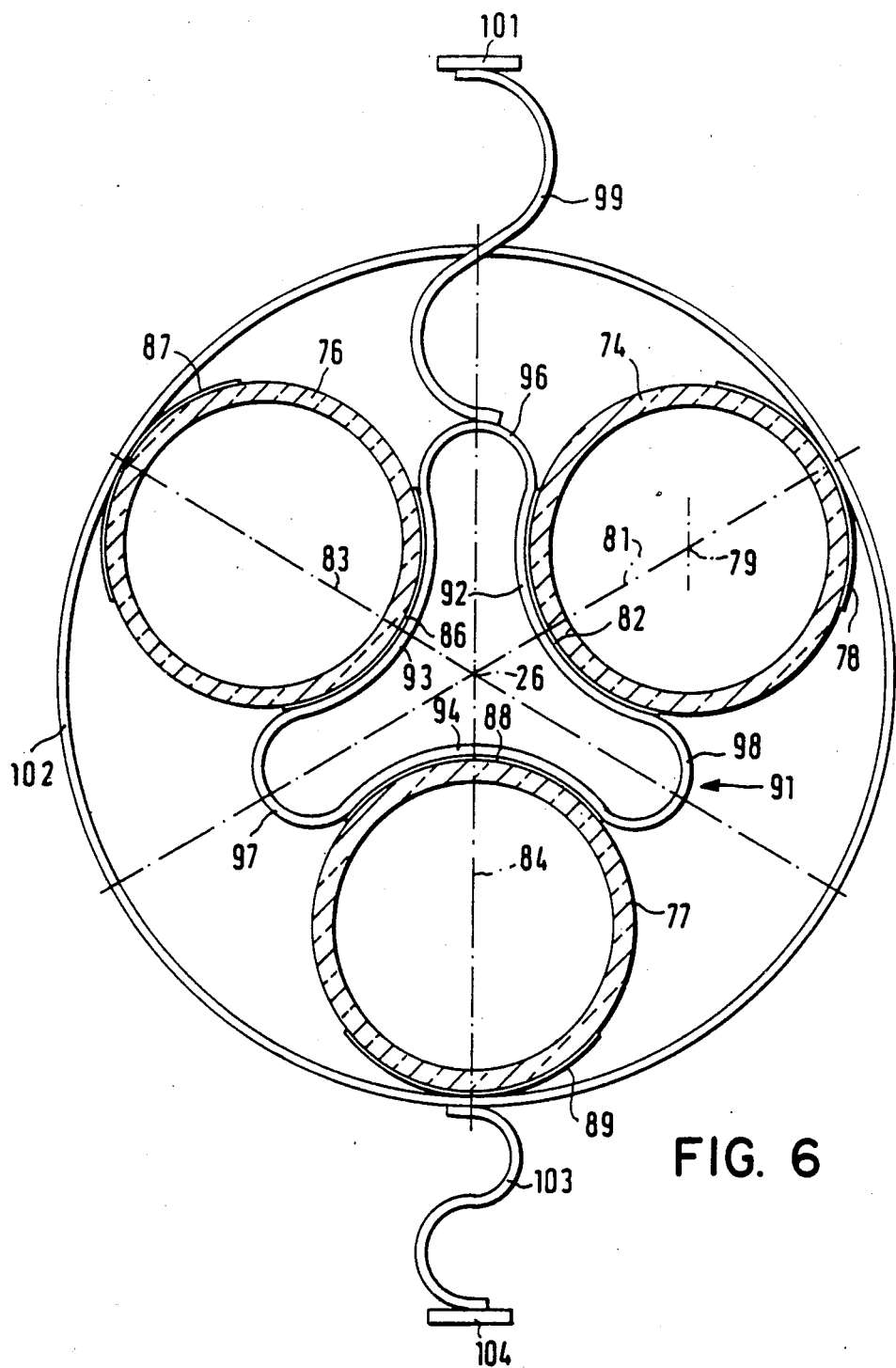
FIG. 6 is a section through a tube device.

The gas flows through the tube device 24 which FIG. 6 shows in the configuration preferred for all examples of the embodiment. It is the principle of this configuration that the individual tubes 74, 76, 77, are disposed serially with each resonance beam path. Therefore, the folded beam paths are not located in a single tube.

A triplet combination of single tubes also has the advantage that the end flange devices 17, 18, are not overloaded with jobs. If there are an even number of individual tubes in the configuration, then in the same end flange device in which the convex mirror 34 is located, there must also be the mirror 53 which serves for disengagement. On the other hand, if the configuration involves an odd number, then one end flange device is used only for deflection while the other is used for deflection and to a certain extent disengagement.

In the case of a quad combination, the geometrical longitudinal axis 26 occupies substantially more area to emit power loss than in the case of a triplet combination. A quintuplet combination would in terms of mirror arrangement indeed make the end flange devices 17, 18, desirably simple, but the construction would be disproportionately more complicated and larger in diameter if the minimum gaps between units are to be maintained. However, if there is no need to fear this difficulty, any type of fold is in principle feasible.

FIG. 6 shows the individual tubes 74, 76, 77, parallel and angularly symmetrical with the geometrical longitudinal axis 26. The tubes are of glass and have an outside diameter of 20 mm and a wall thickness of 2 mm.

Figure 7:
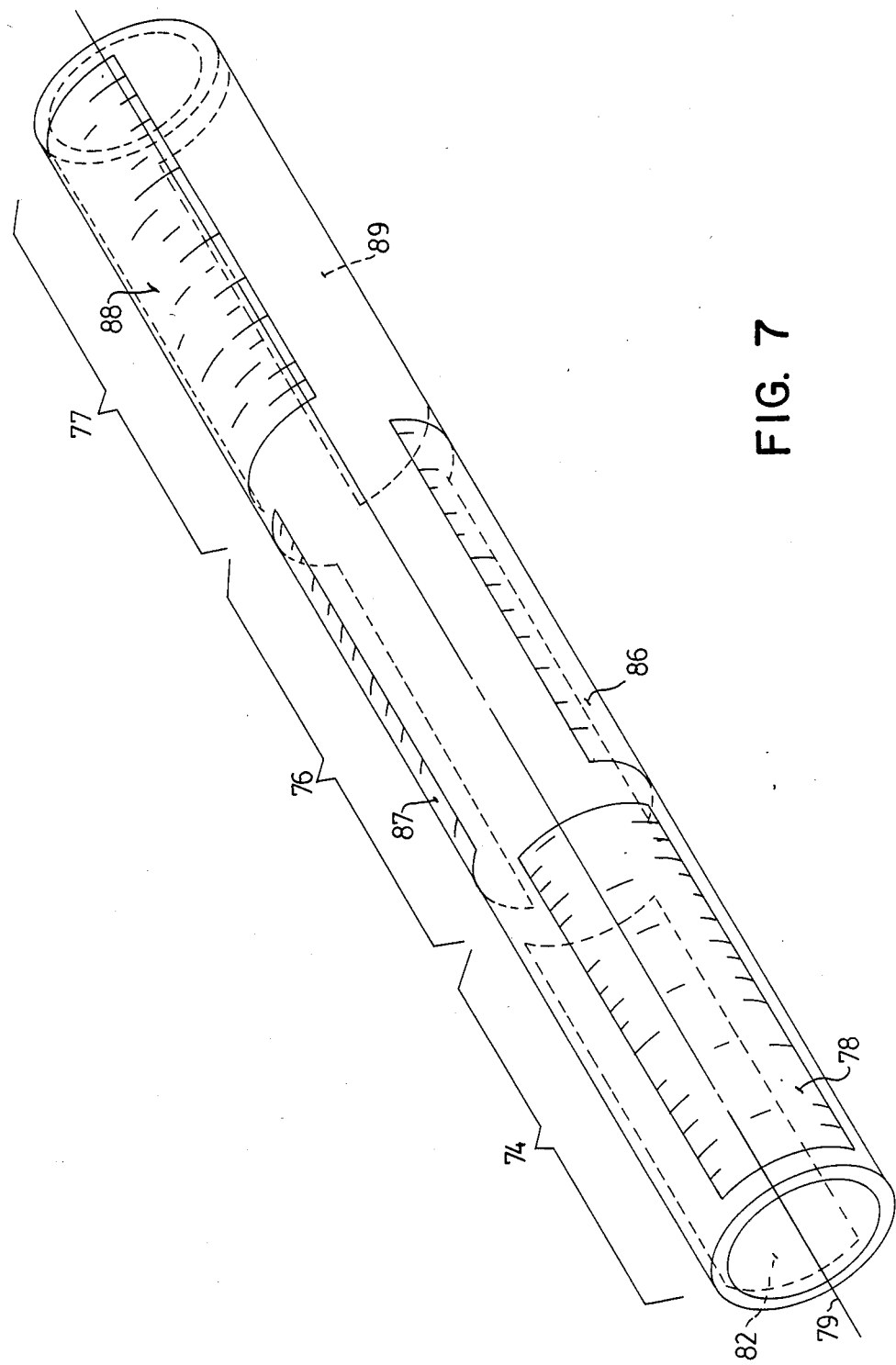
FIG. 7 is the tube device with the individual tubes serially arranged.

FIG. 7 shows the plurality of tubes, as shown in FIG. 6. The individual tubes 74, 76, 77, are serially arranged. These tubes are the equivalent of the folded tubes in FIG. 6 and bear the same reference numerals.

According to FIG. 6, the individual tube 74 is at the top in contact with an annular electrode 78 of copper plate, which extends virtually over the entire length available between the fixing flange 59 and the fixing flange 67. Naturally, these are not contacted. Viewed as from the geometrical longitudinal axis 79 of the individual tube 74, the electrode 78 according to FIG. 6 extends over about 100 degrees, in fact symmetrically of the central plane 81 which extends through the longitudinal axis 26, 79. At the bottom, the individual tube 74 is contacted by a like electrode 82, which extends over the same length, lies symmetrically with the central plane 81 and extends over about 100 degrees of angle. As FIG. 6 shows, further central planes 83, 84, are provided, corresponding to individual tubes 76, 77.

The electrode pairs 78, 82 and 86, 87 and 88, 89 are each diametrically opposed about the beam at the longitudinal axis 79 of the tube. The central planes of the electrode pairs are shifted by an angle that is 360 degrees divided by the number of electrode pairs. In the embodiment, three electrode pairs are provided, so that the central planes of the electrode pairs are shifted 120 degrees from the central planes of adjacent electrode pairs. FIG. 6 shows three electrode pairs, with their central planes 81, 83, 84, shifted 120 degrees from the central planes of adjacent electrode pairs.

The high frequency electrodes 78, 82 and 86, 87 and 88, 89, cover a substantial area spread flat, unlike pin-like or wire-like dimensions. The beam at the longitudinal axis 79 is acted upon symmetrically from different sides, not just one side. This is much like acting and pressing from different sides on dough to form a strand. As a result, the mode comes close to the mode of zeroth order shown in the upper left in FIG. 2. A strip of copper plate a few centimeters wide is bent into a three-pointed star 91 as shown in FIG. 6. The sheet metal strip comprises three 8 mm wide individual segments, its arcuate flank 92 fitting against the electrode 82, while its arcuate flank 93 fits against the electrode 86 and its arcuate flank 94 fits against the electrode 88. The arcuate flanks are in each case connected to one another by bends 96, 97, 98. As can be seen, the arcuate flanks 92, 93, 94, extend from an angular point of view substantially as far as the associated electrodes so that a far-reaching close contact is achieved. The bends 96, 97, 98, project somewhat, as shown. The bend 96 is located in the middle of the length of the tube device 24. Extending upwardly from it is a copper connecting part 99. The connecting part 99 is connected by screws (separably) to a copper strip 101 which extends substantially horizontally to the intermediate flange device 21 where it is connected on the inside to one polarity of the connection 37 for high frequency energy.

The copper strip 101 extends also rightwardly and in the same way is adjacent the individual tubes of the tube device 24 which have like electrodes, a star and a copper connecting part. The outer electrodes 76, 78, 79, in FIG. 6 are contacted by a copper ring 102 which bears on the apices of the electrodes 78, 87, 89. At 6 o'clock, the ring 102 is provided with a copper connecting piece 103. Its other downwardly directed end is galvanically connected to a copper strip 104. The connecting piece 103 according to FIG. 3 is in the left-hand zone of the tube device 24 so that the connecting pieces 99, 103, are sufficiently far apart from each other in order to avoid flash-over or stray capacitance. The copper strip 104 also extends to the tube device 24 located to the right of the intermediate flange device 21 and forms a like connection for this. Inside the intermediate flange device 21, the copper strip 104 is in a manner not shown galvanically connected to the other pole of the connection 37.

Therefore, if a high frequency voltage is applied to the copper strips 101 and 104 and if a laser gas is present in the individual tubes of the tube devices, then discharges occur between the electrode 78, 82; 87, 86; 89, 88.

If there are two tube devices 24 on either side of the intermediate flange device 21, then an electrical connection is made in this way.

If three intermediate flange devices 21, 22, 23, are provided according to FIG. 1, then there is a choice: for example, all high frequency connections 37, 41, 42 can be loaded or the HF connection 41 can be disregarded and only the connections 37, 42, loaded, in which case HF is supplied to the tube devices 24 located on the right and left of the intermediate flange devices 21, 23. It is readily possible to achieve the same effect also with other types of connection.

Figure 2:
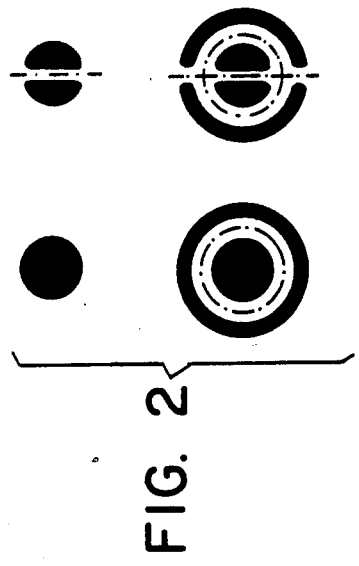
FIG. 2 shows the desired mode together with some undesired modes.

In the case of the embodiment according to FIG. 2—as also in the case of the embodiment shown in FIG. 1—it is ensured that the end flange devices 56, 57, do not tilt in respect of the geometrical longitudinal axis 26 because they are so held by the steel rods 62, 63, 64, which form a cage that the mirrors provided in the end flange devices 56, 57, retain their adjusted position even under conditions of continuous operation. It is also essential that the end zones of the steel rods are rigidly connected to the end flange devices 56, 57, via the fixing flanges 67, 68. Under conditions of continuous operation, it is assured that the steel rods 62, 63, 64, always have the same length even where there are variations in temperature, which can, for example, happen if the steel rods 62, 63, 64, are always kept at the same temperature, which can be achieved by various measures.

Figure 5:
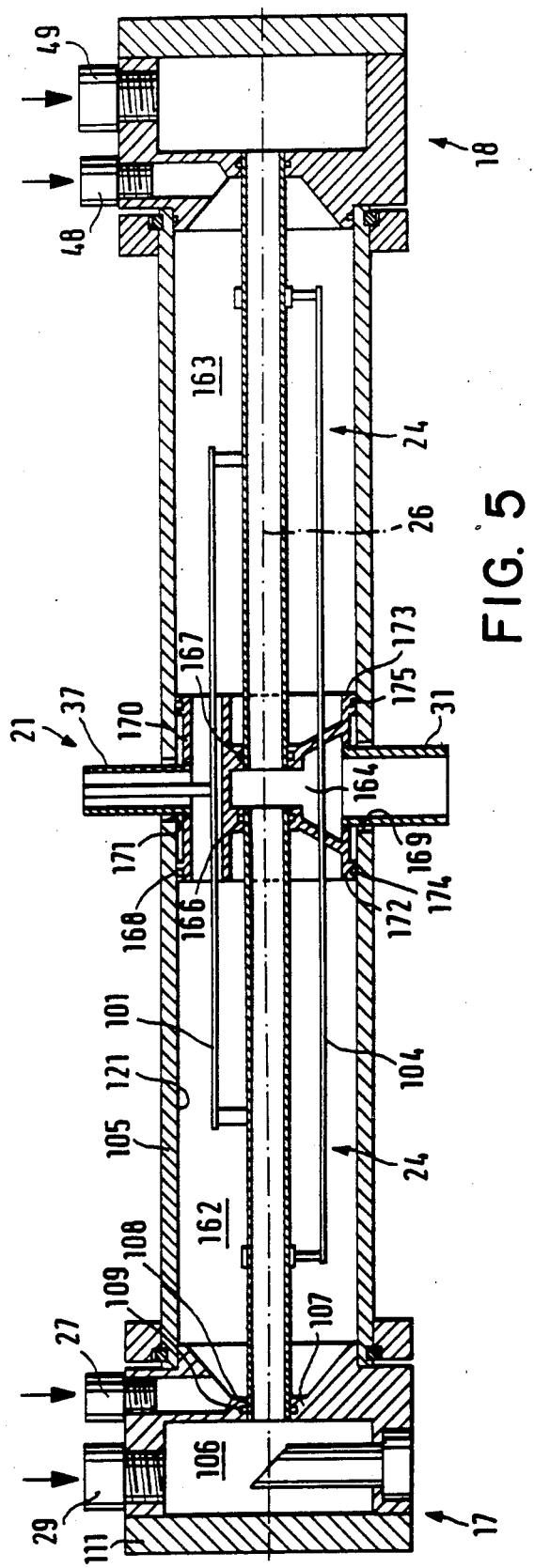
FIG. 5 is a longitudinal section through a device according to FIG. 3 but with a tube as the supporting device.

Along the lines of the solution of the problem, the steel rods 62, 63, 64, can also be replaced by a tube 105 having cut-outs, as already broached in FIG. 1 and as FIG. 5 shows in the case of a laser with two tube devices 24. In this case, the end flange device 17 known from FIG. 1 has this case, the end flange device 17 known from FIG. 1 has the connection 27 for oil and the connection 29 for gas. The gas passes into a cavity 106 in which are located the 45 degree mirrors 32, 33, and the convex mirror 34 as indicated symbolically in FIG. 5. The individual tubes 74, 76, 77, embodied in the tube device 24 communicate with the cavity 106 on the left in FIG. 5. They are held by recesses in an end plate 107 in which there are circularly cylindrical bores 108. Let into the bores 108 is an O-ring gasket 109 so that a fluid-tight bushing is provided which does, however, permit of relative displacements of the end plate 107 in relation to the individual tubes 74, 76, 77, to allow for heat expansion. On the left, the cavity 106 is occluded by a gas-tight screwed-on plate 111 so that together with the end plate 107 and the annular shell 111 a solid end flange device 17 is created which is short when viewed in an axial direction.

What is claimed is:

1. In a longitudinal flow $CO_2$ laser with an output of at least several hundred Watts, having:
    a geometrical longitudinal axis,
    a rectilinear tube device of dielectric material containing $CO_2$, parallel to said longitudinal axis,
    said rectilinear tube device having end zones,
    an end flange device at each end zone of said rectilinear tube device,
    a gas connecting aperture at each of said end flange devices which communicates with said rectilinear tube device, and
    high frequency electrodes extending longitudinally relative to said rectilinear tube device,
    the improvement, in which:
    said high frequency electrodes comprise a plurality of pairs of high frequency electrodes arranged diametrically opposed to each other,
    each of said pair of opposed high frequency electrodes has a central plane,
    said central plane of each pair of high frequency electrodes is offset at an angle relative to the central plane of an adjacent pair of high frequency electrodes, said angle is approximately 360 degrees divided by the number of pairs of high frequency electrodes, and
    each of said pair of high frequency electrodes contacts said rectilinear tube device over a significant lateral distance relative to the length of said rectilinear tube device.

2. Device according to claim 1, comprising three pairs of high frequency electrodes offset approximately 120 degrees from each other.

3. Device according to claim 1, comprising four pairs of high frequency electrodes offset approximately 90 degrees from each other.

4. Device according to claim 1, wherein said laser is a folded longitudinal flow $CO_2$ laser in which said tube device comprises a plurality of individual tubes between said end flange devices, disposed serially per fold path.

5. Device according to claim 4, wherein said individual tubes are disposed symmetrically of said geometrical longitudinal axis.

6. Device according to claim 5, wherein said high frequency electrodes lie symmetrically with planes that pass through said geometrical longitudinal axis, said individual tubes have inner and outer high frequency electrodes, a common outer ring connects said outer high frequency electrodes, a common inner ring connects said inner high frequency electrodes, first and second connecting lines connect to said common outer and inner rings respectively, and a high frequency connection is connected to said first and second high frequency connecting lines.

7. Device according to claim 6, wherein said common inner ring is folded like a star having as many points with flanks and end zones as there are associated individual tubes, said end zones of said points being disposed between adjacent tubes while said flanks of each of said star points follow circular segments of said inner electrodes.

8. Device according to claim 7, wherein said end flange devices have outer contours that are substantially circularly cylindrical in relation to said geometrical longitudinal axis.

9. Device according to claim 4, wherein said individual tubes are composed of inorganic glass.

10. Device according to claim 4, wherein said individual tubes are of equal length.

11. Device according to claim 4, wherein said individual tubes have the same inside and outside diameter and are of the same material.

12. Device according to claim 1, cormprising a supporting device with a plurality of circularly-cylindrical, axially-parallel rods, said rods having end zones fixed to said end flange devices at the same angular spacing from one another.

* * * * *